US010819680B1

(12) United States Patent
Santan et al.

(10) Patent No.: US 10,819,680 B1
(45) Date of Patent: Oct. 27, 2020

(54) INTERFACE FIREWALL FOR AN INTEGRATED CIRCUIT OF AN EXPANSION CARD

(71) Applicant: Xilinx, Inc., San Jose, CA (US)

(72) Inventors: Sonal Santan, San Jose, CA (US); Umang Parekh, San Jose, CA (US); Jeffrey H. Seltzer, Los Gatos, CA (US); Khang K. Dao, San Jose, CA (US); Kyle Corbett, Campbell, CA (US)

(73) Assignee: XILINX, INC., San Jose, CA (US)

( * ) Notice: Subject to any disclaimer, the term of this patent is extended or adjusted under 35 U.S.C. 154(b) by 357 days.

(21) Appl. No.: 15/915,981

(22) Filed: Mar. 8, 2018

(51) Int. Cl.
*H04L 29/06* (2006.01)
*G06F 13/42* (2006.01)

(52) U.S. Cl.
CPC ...... *H04L 63/0209* (2013.01); *G06F 13/4265* (2013.01); *H04L 63/029* (2013.01); *H04L 63/0263* (2013.01)

(58) Field of Classification Search
None
See application file for complete search history.

(56) References Cited

U.S. PATENT DOCUMENTS

| | | | |
|---|---|---|---|
| 6,219,724 B1 | 4/2001 | Kim et al. | |
| 7,216,043 B2 * | 5/2007 | Ransom | G01D 4/004 |
| | | | 702/62 |
| 7,299,277 B1 * | 11/2007 | Moran | H04L 41/5022 |
| | | | 370/230 |
| 7,424,744 B1 * | 9/2008 | Wu | H04L 63/1416 |
| | | | 370/392 |
| 7,484,008 B1 * | 1/2009 | Gelvin | G06F 15/173 |
| | | | 709/249 |
| 8,719,925 B1 * | 5/2014 | Berg | G06F 21/566 |
| | | | 726/22 |
| 8,713,327 B1 | 11/2014 | Peterson et al. | |
| 9,047,474 B1 | 6/2015 | Ahmad et al. | |
| 9,213,866 B1 | 12/2015 | Ahmad et al. | |

(Continued)

OTHER PUBLICATIONS

Delgado, Raimarius et al. Application of EtherCAT in Microgrid Communication Network: A Case Study. 2018 International Conference on Platform Technology and Service (PlatCon). https://ieeexplore.ieee.org/stamp/stamp.jsp?tp=&arnumber=8472736 (Year: 2018).*

(Continued)

*Primary Examiner* — Jeremiah L Avery
(74) *Attorney, Agent, or Firm* — Patterson + Sheridan, LLP

(57) ABSTRACT

System and method generally relate to protection of a bussed network. In such a system, an access controller is configured for bussed communication via a communication bus to obtain a current transaction. An interface firewall is coupled for bussed communication with the access controller and configured to check for a fault associated with a transfer. A data processing device is coupled for communication with the interface firewall and configured to execute the current transaction to provide the transfer for the interface firewall. The interface firewall is configured to detect the fault associated with the transfer, to block access to the data processing device associated with the fault, and to communicate a blocked status for the data processing device.

20 Claims, 10 Drawing Sheets

(56) References Cited

U.S. PATENT DOCUMENTS

| | | | |
|---|---|---|---|
| 9,465,766 B1 | 10/2016 | Knopp et al. | |
| 9,645,951 B1 | 5/2017 | Wang et al. | |
| 2002/0040439 A1* | 4/2002 | Kellum | G06F 21/567 726/26 |
| 2002/0077177 A1* | 6/2002 | Elliott | A63F 13/71 463/40 |
| 2004/0139350 A1* | 7/2004 | Lyon | H04L 63/029 726/11 |
| 2006/0053491 A1* | 3/2006 | Khuti | H04L 63/1416 726/23 |
| 2006/0064469 A1* | 3/2006 | Balasubrahmaniyan | H04L 63/029 709/218 |
| 2007/0226795 A1* | 9/2007 | Conti | G06F 21/554 726/22 |
| 2013/0204466 A1* | 8/2013 | Ricci | G06F 3/0484 701/2 |
| 2014/0041012 A1* | 2/2014 | Yeow | H04L 63/20 726/11 |
| 2015/0288659 A1* | 10/2015 | Lukacs | G06F 21/575 713/2 |
| 2017/0364711 A1* | 12/2017 | Rhelimi | G06F 21/44 |

OTHER PUBLICATIONS

Apon, Amy; Wilbur, Larry. AmpNet—A Highly Available Cluster Interconnection Network. Proceedings International Parallel and Distributed Processing Symposium. https://ieeexplore.ieee.org/stamp/stamp.jsp?tp=&arnumber=1213370 (Year: 2003).*

Xilinx, "AXI Protocol Firewall IP v1.0 LogiCORE IP Product Guide," PG293, Oct. 4, 2017, Xilinx, Inc., San Jose, California, USA.

* cited by examiner

INTERFACE FIREWALL FOR AN INTEGRATED CIRCUIT OF AN EXPANSION CARD

FIELD OF THE INVENTION

The following description relates to an interface firewall for integrated circuit devices ("ICs"). More particularly, the following description relates to an interface firewall for an IC of an expansion card.

BACKGROUND

Recently, system-on-chips ("SoCs"), such as Field Programmable Gate Arrays ("FPGAs") and other types of SoCs, Application Specific Integrated Circuits ("ASICs"), graphics processing units ("GPUs"), digital signal processors ("DSPs"), and other types of ICs have been used for offloading workloads from a central processing unit ("CPU") of a host system for processing, such as for purposes of acceleration in processing data. FPGA-based cards, GPU-based cards, DSP-based cards, ASIC-based cards, or other expansion or daughter cards may be designed with a high bandwidth bus interface, such as with a PCIe or other host bus interface for example, for slotting or otherwise interconnecting to a backplane, a motherboard, or other circuit board with bussing. These expansion cards are sometimes referred to as acceleration circuit boards or accelerator cards. For data center applications, multiples of such accelerator cards may be bussed in a host server or a backplane in communication with a host server to accelerate processing of data.

A system crash may be due to an operation in an expansion card. Accordingly, it would be desirable and useful to avoid a system crash due to an operation in an expansion card.

SUMMARY

A system generally relates to protection of a bussed network. In such a system, an access controller is configured for bussed communication via a communication bus to obtain a current transaction. An interface firewall is coupled for bussed communication with the access controller and configured to check for a fault associated with a transfer. A data processing device is coupled for communication with the interface firewall and configured to execute the current transaction to provide the transfer for the interface firewall. The interface firewall is configured to detect the fault associated with the transfer, to block access to the data processing device associated with the fault, and to communicate a blocked status for the data processing device.

A method generally relates to protection of a bussed network. In such a method, communication to an access controller via a communication bus is performed to obtain a current transaction. The current transaction is bussed to an interface firewall coupled for bussed communication with the access controller. The current transaction is passed to a data processing device coupled for communication with the interface firewall. The current transaction is executed by the data processing device to provide a transfer to the interface firewall. The interface firewall checks for a fault associated with the transfer. The fault associated with the transfer is detected by the interface firewall. Access is blocked by the interface firewall to the data processing device associated with the fault. The interface firewall communicates a blocked status for the data processing device.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2-1 is a block diagram depicting an exemplary host system.

FIG. 2-2 is the same as FIG. 2-1, except in the example of FIG. 2-2 a protocol break or other fault is depicted.

FIG. 7-1 is a block-schematic diagram depicting an exemplary interface firewall circuit.

FIG. 7-2 is a state diagram depicting an exemplary finite state machine.

DETAILED DESCRIPTION

Figure 1:
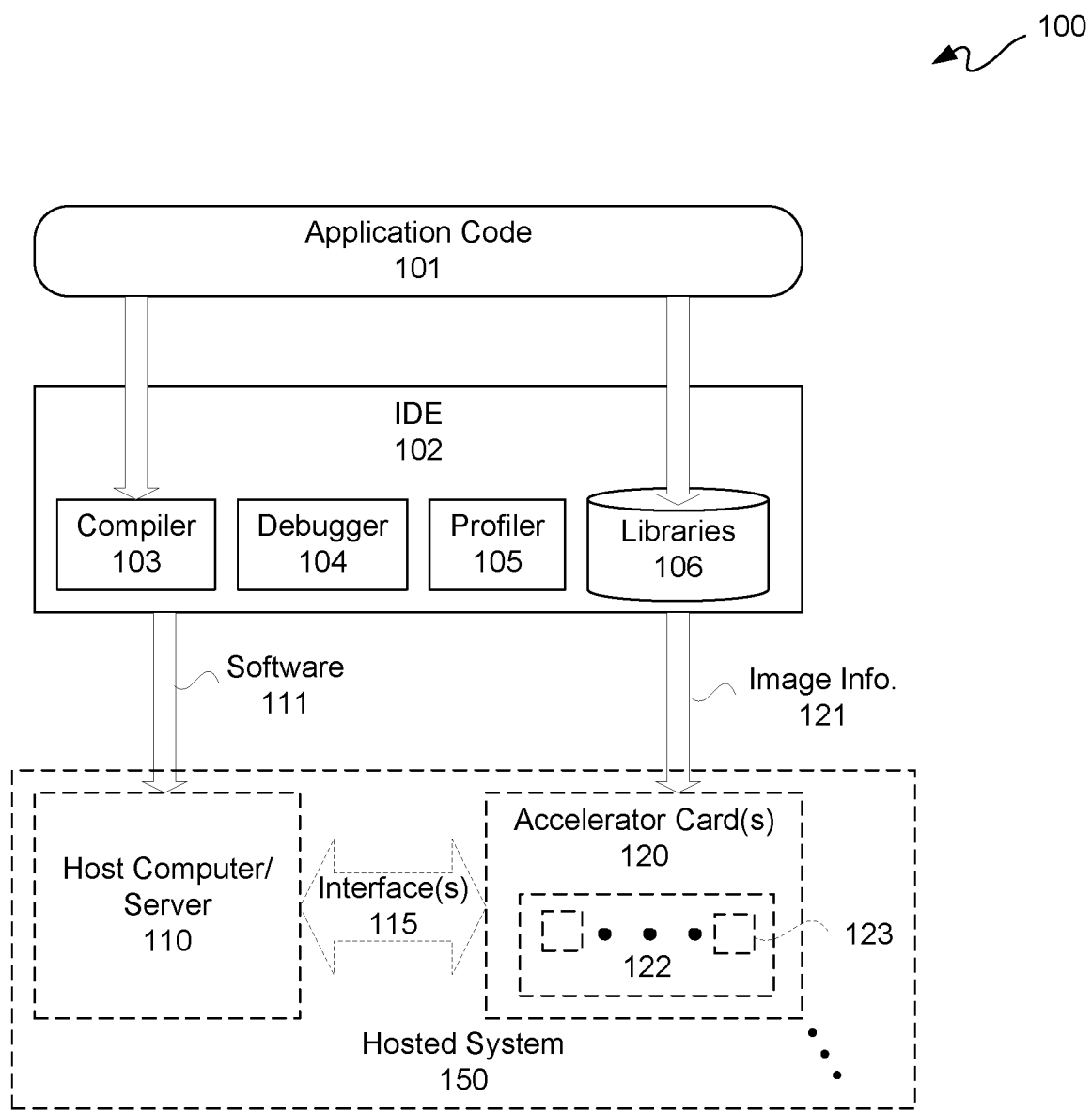
FIG. 1 is a block diagram depicting an exemplary development environment.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Integrated development environments ("IDEs") have emerged for use with system-on-chips ("SoCs") and other types of ICs. An IDE is a software application, which may include a source code editor, build automation tools, and a debugger, to provide a set of software components with same or similar user interfaces for software development by software developers. Some IDEs, such as NetBeans and Eclipse, include a compiler and/or an interpreter. Other examples of IDEs include SDx, SharpDevelop, Anjuta, Visual Studio, KTechlab, and Lazarus. Additionally, an IDE is not limited to a thin-client software product, but may be provided as a Cloud-based platform, such as a Platform-as-a-Service ("PaaS") for example.

While some IDEs are programming language specific, other IDEs support multiple programming languages. Examples of programming languages supported by IDEs include RTL, C/C++, Ada, GNAT, Perl, Python, Ruby, PHP, Java, C#, and Lisp. Additionally, Open Computing Language or OpenCL may be used as a framework for writing programs to execute across heterogeneous platforms, such as across central processing units ("CPUs"), graphics processing units ("GPUs"), digital signal processors ("DSPs"), field-programmable gate arrays ("FPGAs"), and other processors or hardware accelerators.

A software-defined system ("SDx") may be implemented as an accelerator in any of a variety of configurations. Such configurations may include a system-on-chip ("SoC") with one or more embedded processors in such SoC, an SoC with a processor instantiated in programmable logic resources of such SoC, an SoC with an external processor, such as connected through a PCIe or other bus for example. Thus, for purposes of clarity by way of non-limiting example, a Software-Defined System-on-Chip ("SDSoC") environment may be provided using Eclipse to implement a heterogeneous embedded system in a SoC, such as a single-core or multi-core processor SoC, a multiprocessor SoC ("MPSoC") or other SoC. An MPSoC may include two or more single-core or multi-core processors. Even though an SDSoC is used below for purposes of clarity by way of example, more generally an SDx may be used.

For purposes of clarity by way of non-limiting example, the following description is for an Eclipse-based IDE for an embedded RTL, C/C++, and OpenCL application development environment for an FPGA-based accelerator, though other types of IDEs, accelerators, and/or programming languages may be used. Additionally, for purposes of clarity by way of non-limiting example, the following description is for an FPGA which is an ARM-based MPSoC, though SoCs with IBM, Apple, Intel, AMD, or other embedded processors may be used in other examples.

Additionally, for purposes of clarity by way of non-limiting example, it shall be assumed that an application may be written in C/C++, which may be compiled to provide software acceleration in programmably configurable logic circuitry of an MPSoC with automated system connectivity generation using ARM-based bussing. Such SDSoC application identifies such MPSoC and a set of functions to be compiled to provide hardware configuration information for programmably configurable logic circuitry of such an MPSoC, as well as to identify and activate dedicated hardware resources to be used. Along those lines, an SDSoC compiler may compile an SDSoC application into hardware and software to realize an embedded system implemented with an MPSoC. Such a compiled outcome of an SDSoC application may for example include a boot image with firmware, an operating system, and an executable application ("executable"). Such an executable may be or may include one or more configuration bitstreams for configuring programmably configurable logic circuitry.

With respect to implementation in programmably configurable logic circuitry, sometimes referred to as programmable hardware or programmable resources, an IDE environment may be used to abstract hardware to be used through increasing layers of software abstraction, including cross-compilation and linking of C/C++ functions into sets of programmably configurable logic circuitry ("programmable logic fabric"). Software resulting from such compiling may be defined for use by one or more embedded ARM CPUs of an MPSoC. Based on user specified program functions to execute in programmable logic fabric, an SDSoC environment may perform program analysis, task scheduling, and binding or linking onto programmable logic fabric and/or one or more embedded ARM CPUs. Additionally, an SDSoC environment responsive to user specified program functions may generate hardware and software code to automatically implement communication and cooperation among hardware and software components of a user-defined SDSoC.

In the past, an embedded protocol monitor was interrogated to determine what crashed a system; however, this did not prevent a system crash. If a system crashes, a bus goes down and must be reset to revive such bus. This means that debugging cannot be performed in real-time unless there is a separate net, other than a host net, with an active bus or link to such embedded protocol monitor to interrogate same. Thus, a host was not available to participate in diagnosis and could not recover without reset. Generally, the fix and sequence for many expansion cards was to have a brute force reset signal, such as via a button to be pushed, and then wait for such expansion card to come back on line.

As described below in additional detail, an interface firewall is used to prevent a fault from passing to a trusted side of a net. A host device may be on a trusted side. By preventing a fault from passing to a host device for example, such host device, as well as a bus interconnection to an expansion card, may stay operational even though a subsystem of such expansion card is blocked by an interface firewall responsive to detection of a fault from or with such sub-system. This may avoid a system crash and allow a host device to participate in diagnostics, as well as recovery, in real-time.

FIG. 1 is a block diagram depicting an exemplary SDSoC development environment 100. Components of such an SDSoC development environment 100, including user developed application code 101, are illustratively depicted with solid lines. While a hosted system 150, which may benefit from output of such SDSoC development environment 100, is shown with dashed lines.

Application code 101 may be provided to a compiler 103 of an IDE 102. In this example, IDE 102 includes a compiler 103, a debugger 104, a profiler 105, and libraries 106. IDE 102 may be a Cloud-based platform, a workstation-based platform, server-based platform, or other computing-based platform. In this example, application code 101 is for OpenCL, C, and/or C++; however, in another example, a same and/or different framework and/or same or different programming languages may be used. Compiler 103 may be optimized for architecture of one or more different expansion boards or cards, such as for example an accelerator card 120. Moreover, RTL-based or other HDL-based circuit functional unit descriptions in libraries 106 may be optimized for architecture of one or more different accelerator cards 120, including without limitation an FPGA or FPGAs thereof.

Output from IDE 102 may include both software 111 and boot image information 121. Boot image information 121 may be provided to one or more accelerator cards 120. Boot image information 121 may include a boot image, an operating system, firmware, and/or a configuration bitstream or other form of configuration information. Configuration information may be used to program programmable resources 122, such as of programmable logic fabric, to provide one or more hardware functional circuits 123.

Software 111 may include one or more drivers and/or application program interfaces ("APIs") for working with accelerator cards 120. Software 111 may be provided to a host computer/server 110. One or more accelerator cards 120 may be interconnected to one or more corresponding interfaces 115 of host computer/server 110 or a backplane of host server 110, such as for example slotted in slots of a backplane thereof. In this non-limiting example, host computer/server 110 is an x86-based server, and interfaces 115 are PCIe interfaces. Even though only one master or "primary" device, namely host computer/server 110, is illustratively depicted, in other examples there may be more than one primary device. Along those lines, there may be more than one interface 115 to an expansion card 120, and/or more than one expansion card 120.

A bus protocol violation or other fault condition, such as caused by an error in a slave or "secondary" device, a driver in a kernel of a secondary device, a software application, or other origin, can cause an entire host system platform to stall, deadlock, hang, or crash. In some instances, a stall or hang may be cleared in time to avoid a system reset, but the amount of wait time may be too long for many accelerator applications though data may be retained by waiting for clearing of such stall or hang. A deadlock may not be cleared over any length of time without corrective action, and such corrective action can include an entire system reset. Data may be lost due to a deadlock. A crash of a system may involve loss of data and may compromise system operation. Thus, any and all of stalls, deadlocks, hangs, or crashes due to bus protocol violations or other fault conditions are to be avoided or mitigated, as described below in additional detail. For purposes of clarity and not limitation, the term "system hang" and variations thereof are used below to refer to any or all of system stalls, deadlocks, hangs, or crashes.

As described below in additional detail, an interface firewall may be used to insulate a host system platform or an accelerator card from a bus protocol violation or other fault condition to prevent such a protocol violation or fault condition from hanging up a system. Such an error may originate on a host system side of a communication bus and/or on an accelerator card side of a communication bus, as described below in additional detail. For example, in hardware acceleration systems in which a user-defined acceleration kernel is loaded into a reprogrammable region of an FPGA, potentially harmful conditions may arise in such kernel. An interface firewall may be used to prevent such potentially harmful conditions from blocking host access to such FPGA, such as via a PCIe interface, which PCIe interface may remain operational by avoiding a system hang caused by a harmful condition arising in such kernel.

To mitigate the effects of a protocol violation or a fault condition, driver code may include availability of a system call that resets, restarts or re-initializes one or more hardware functional circuits within an SDSoC implemented system without resetting, restarting or re-initializing (hereinafter collectively and singly "reset" and variations thereof) the whole SDSoC implemented system. Optionally, to mitigate the effects of a protocol violation or a fault condition, the whole SDSoC implemented system, namely the entire accelerator card 120, may be reset.

Accordingly, run-time behavior of bus activity in an SDSoC implemented system may include one or more hardware functional circuits executing a corresponding resetting, restarting or re-initializing sequence, apart from during an initial system start-up of an accelerator card 120. Moreover, though an entire accelerator card 120 may be reset, only a portion of an accelerator card 120 may be reset, which may be additionally useful in implementations supporting multiple communication links. Thus, while one or more hardware functional circuits of an SDSoC implemented system may be executing a resetting, restarting or re-initializing sequence, apart from during an initial system start-up of an accelerator card, other hardware functional circuits of such SDSoC implemented system connected via a same system bus though on different communication channels may not be executing a resetting, restarting or re-initializing sequence. In short, other hardware circuits may be doing their "regular jobs" while simultaneous executing a reset of a hardware circuit potentially causing a system hang for example.

With the above general understanding borne in mind, various configurations for systems including an accelerator card with at least one interface firewall are described below.

Figures 1, 2:
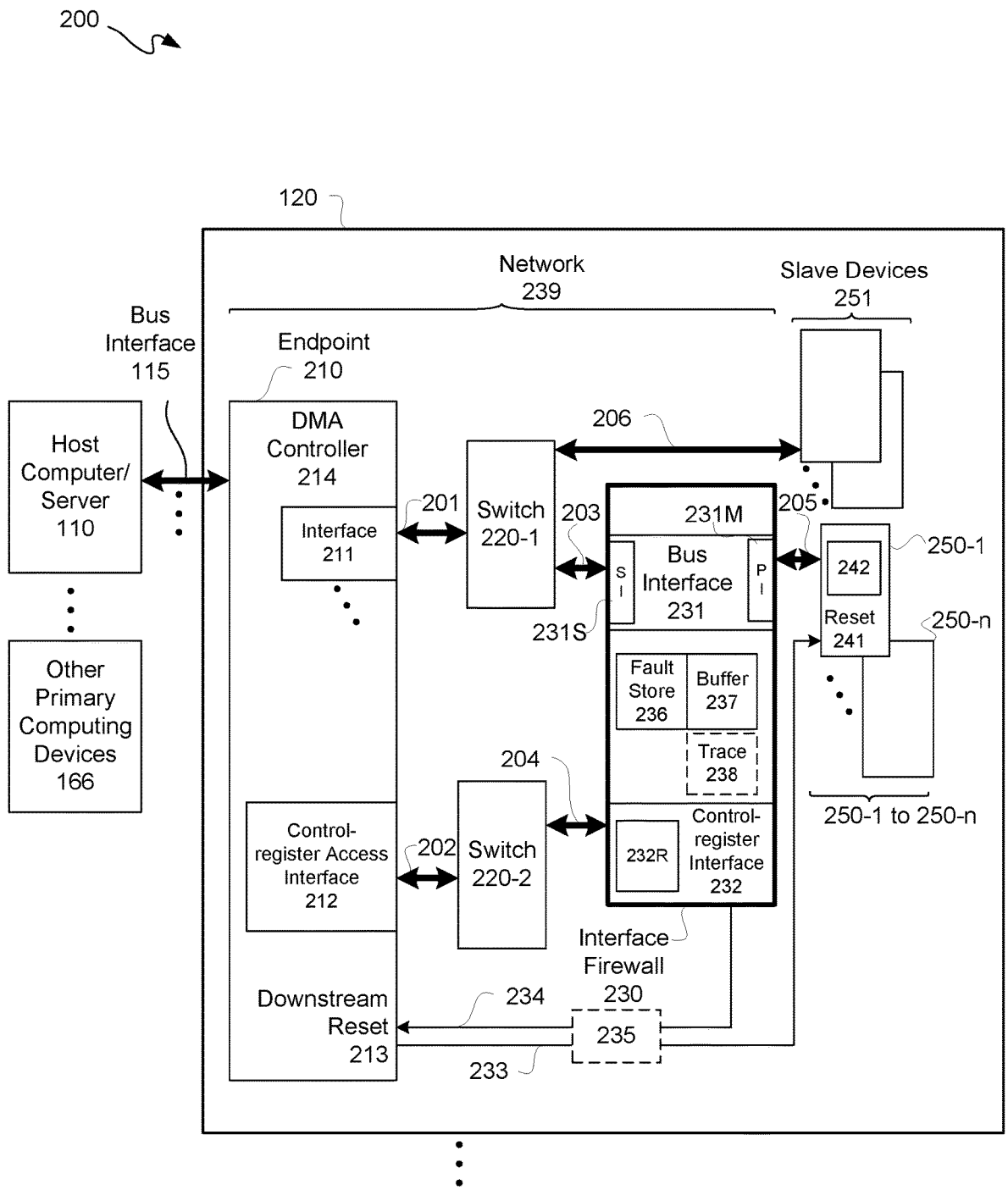
Figure 2:
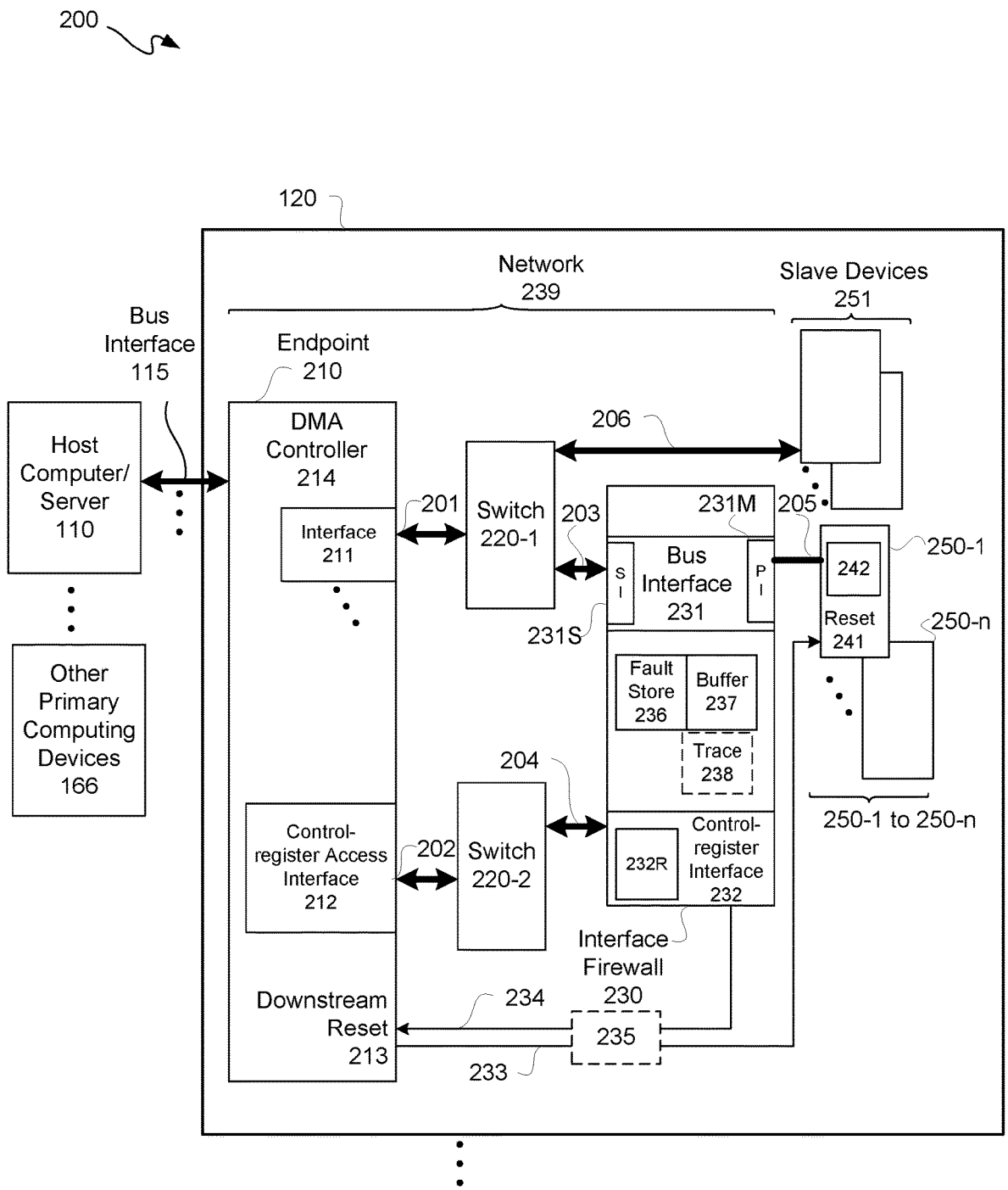

FIG. 2-1 is a block diagram depicting an exemplary host system 200. Host system or bussed network 200 includes a host computer/server 110 and one or more accelerator cards 120. Moreover, there may be other primary computing devices 166 other than host computer/server 110 coupled to an accelerator card 120 via a communication bus. In this example, a single accelerator card 120 for a single bus interface 115 is illustratively depicted; however, multiple accelerator cards 120 and corresponding bus interfaces 115 may be implemented for servicing a host computer/server 110, as described below in additional detail. Moreover, in this example, accelerator card 120 is an FPGA-based accelerator card; however, other types of accelerator cards, such as ASIC-based, DSP-based, GPU-based, or other IC-based accelerator cards may be used.

Host computer/server 110 is in communication with accelerator card 120 via a bus interface 115. In this example, bus interface 115 is a PCIe bus interface, and host computer/server 110 is an x86-based server. However, other types of bus interfaces and/or other types of host devices may be used in accordance with the description herein. Moreover, even though an accelerator card 120 is described, other types of peripheral cards or other daughter or expansion cards using protocol-based communication may implement an interface firewall 230 as described herein. In this example, an Advanced eXtensible Interface ("AXI") protocol for an interface firewall 230 is described, though other types of bus protocols may be used in other examples. Examples of AXI bus protocol violations that may occur triggering a block by interface firewall 230 may include one or more of: ERRS_BRESP—a secondary device must only give a write response after both the write address and the last write data item are transferred and the BID, if any, must match an outstanding AWID; ERRS_RDATA_NUM—the number of read data items must match the corresponding ARLEN (does not apply to AXI-Lite protocol); and ERRS_RID—a secondary device can only give read data in response to an outstanding read transaction, and the RID, if any, must match an outstanding ARID.

An AXI interface of an ARM Advanced Microcontroller Bus Architecture ("AMBA"), namely an open-standard, on-chip interconnect specification for connection and management of functional blocks in SoC designs, may include: separate address/control and data phases, support for unaligned data transfers using byte strobes, burst based transactions with only a start address issued, issuing of multiple outstanding addresses with out of order responses, and addition of register stages to provide timing closure. However, other types of bus interfaces may be used, such as from Apple, Intel, IBM, or AMD for example.

Other than bus protocol violations, other faults may trigger a block by interface firewall 230. Examples of timeout faults that may trigger a block by interface firewall 230 may include one or more of: RECS_AWREADY_MAX_WAIT—AWREADY should be asserted within MAXWAITS cycles of AWVALID being asserted; RECS_WREADY_MAX_WAIT—WREADY should be asserted within MAXWAITS cycles of WVALID being asserted; RECS_ARREADY_MAX_WAIT—ARREADY should be asserted within MAXWAITS cycles of ARVALID being asserted; RECS_CONTINUOUS_RTRANSFERS_MAX_WAIT—RVALID should be asserted within MAXWAITS cycles of either AR command transfer or previous R transfer while there are outstanding AR commands; RECS_WRITE_TO_BVALID_MAX_WAIT—BVALID should be asserted within MAXWAITS cycles of AW command transfer or WLAST transfer (whichever is later), or previous B transfer if there are yet more AW and WLAST transfers outstanding. For timeout checks, any change in value written to any MAX_WAIT control register may take effect only while a watchdog timer is not actively counting. That is, while the earlier qualifying condition (such as ARVALID assertion) is false or while the later triggering condition (such as ARREADY assertion) is true, a watchdog timer counting for the corresponding check is disabled and such counter is continually re-loaded with the value currently stored in a corresponding MAX_WAIT register. Once a timeout count begins, the last MAX_WAIT value loaded for such count is used to determine the triggering of a fault. A MAX_WAIT register, namely maximum wait time register, may be a register of a control-register of control-register interface 232, which may be set to a maximum wait time.

Accelerator card 120 may include a PCIe endpoint 210. In this example, PCIe endpoint 210 is a direct memory address ("DMA") controller or bridge 214. More particularly, a crossbar bridge DMA controller is described; however, in another example, a different PCIe endpoint or other type of communication bus endpoint may be used. For example, a Universal Serial Bus ("USB") controller may be used, among other examples.

DMA controller 214 may include an internal DMA host interface, a DMA host data port, management interface/registers, and/or other known circuitry, which is not described herein for purposes of clarity and not limitation. In this example, DMA controller includes a "downstream" reset output port 213, at least one master or primary interface 211, and a control-register access primary interface 212. In this example, primary interface 211 is configured for an AXI4 protocol as an AXI4 primary interface. Furthermore, in this example, control-register access primary 212 is configured for an AXI4-Lite protocol.

An AXI4 protocol is a superset of an AXI4-Lite protocol. However, an AXI4, AXI4-Lite, and/or other bus communication protocol or protocols may be used in other examples.

In this example, DMA controller 214 is configured using programmable fabric responsive to known AXI DMA and AXI Interconnect configuration products, such as are commercially available for example. This allows features for such DMA controller 214 to be selected by a user.

Figure 3:
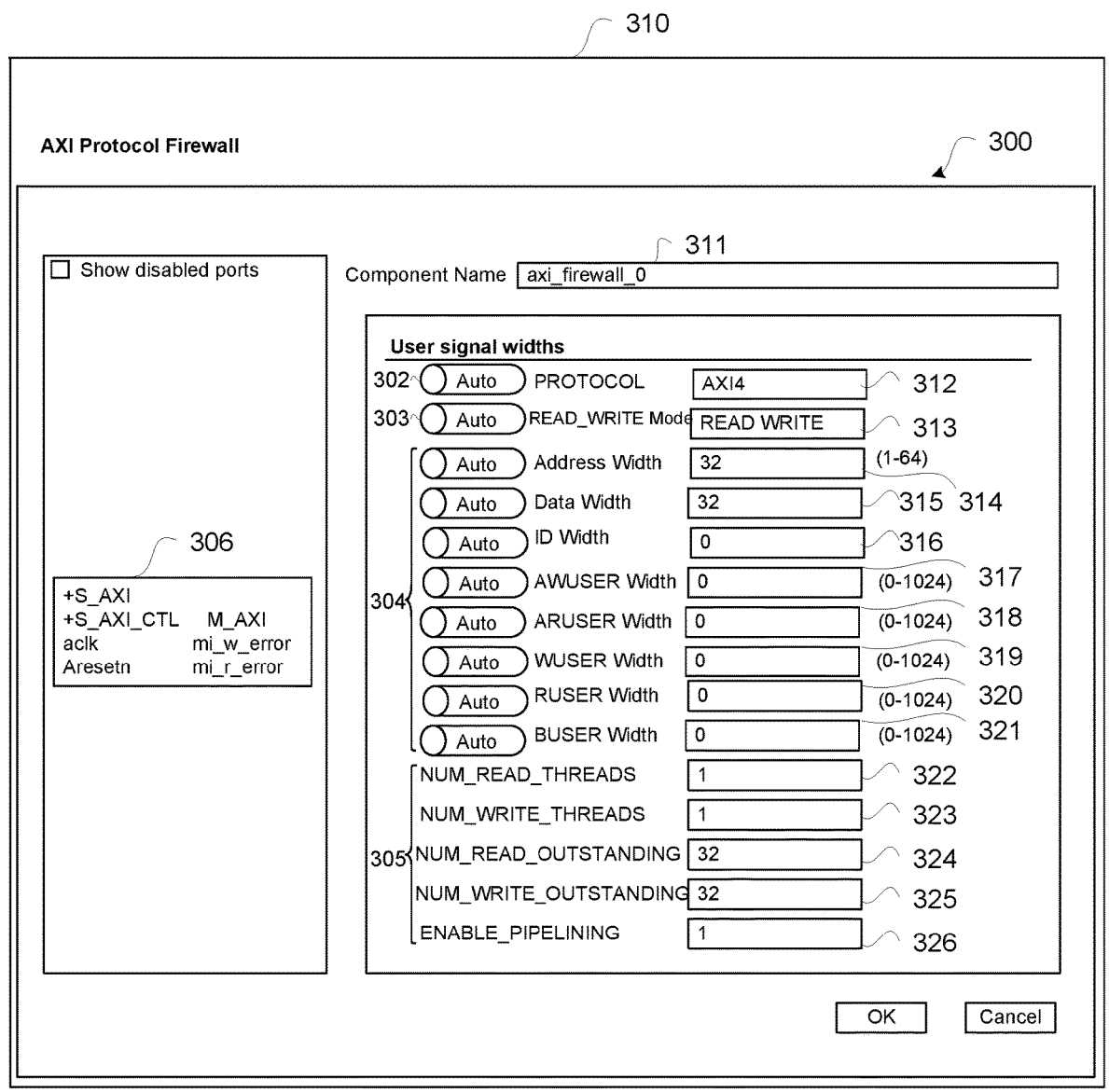
FIG. 3 is a screen image diagram depicting an exemplary graphic user interface displayed on a display screen.

FIG. 3 is a screen image diagram depicting an exemplary graphic user interface ("GUI") 300 displayed on a display screen 310. GUI 300 may be for user customization and/or default settings for an "IP" block for configuring an interface firewall 230 of FIG. 2-1 for example. GUI 300 may include fields 311 through 326, which are described below in additional detail with simultaneous reference to FIGS. 1 through 3.

Field 311 is a component name field for a user to provide a field name to an interface firewall 230. Field 312 is a bus protocol field to configure a bus interface of an interface firewall 230. A button 302 may be used to automatically default to an AXI4 protocol in this example; otherwise, another bus interface protocol may be selected by a user by way of a pull-down menu of field 312.

Field 313 is a read/write mode field to configure a bus interface of an interface firewall 230. A button 303 may be used to automatically default to a read write protocol in this example; otherwise, another read/write protocol may be selected by a user by way of a pull-down menu of field 313.

Buttons 304 may be used for selection of various default widths. Fields 314 through 321 are used to configure a bus interface of an interface firewall 230 for address width, data width, identification width, and various user widths. Buttons 304 may be used to automatically default to an address width of 32 bits, a data width of 32 bits, an identification width of 0 bits, an address write user ("AWUSER") width of 0 bits (disabled), an address read user ("ARUSER") width of 0 bits (disabled), a write user ("WUSER") width of 0 bits (disabled), a read user ("RUSER") width of 0 bits (disabled), respectively for fields 314 through 321 in this example; otherwise, one or more other widths may be selected by way of pull-down menu or user input. Along those lines, for this example, fields 317 through 321 are limited to be from 0 to 1024 bits. However, these or other bit widths may be used in other examples.

Fields 322 through 326 in this example respectively are for number of read threads, number of write threads, number of outstanding reads allowed, number of outstanding writes allowed, and whether pipelining is activated or not, as respectively indicated with labels 305.

Icon 306 is an interface firewall icon. Along those lines, an interface firewall 230 may include a secondary interface for an AXI protocol ("S_AXI"), a secondary AXI control-register interface ("S_AXI_CTL"), a master or primary interface for an AXI protocol ("M_AXI"), a master or primary interface write error port ("mi_w_error"), a master or primary interface read error port ("mi_r_error"), an clock port ("aclk"), and an reset port ("aresetn") for 1 to n secondary devices, where secondary devices are numbered from 1 to n for example. Error signals mi_r_error and mi_w_error of bussed signals 234 may be service interrupts used to assert an error state detected by interface firewall 230.

Returning to FIG. 2-1, continuing the above example of an AXI protocol, interface firewall 230 may be configured as an AXI interface firewall though other protocols for an interface firewall 230 may be used in other examples. More particularly, an example of AXI protocol firewall library resource to configure programmable resources to protect an AXI XDMA, namely a crossbar DMA switch, from hangs and protocol violations downstream of such AXI XDMA is described. Such hangs and protocol violations may lead to host system crashes without such protections afforded by such an AXI protocol firewall.

In this non-limiting example, DMA controller 214 is an AXI DMA controller, which can operate in a simple DMA mode or a scatter/gather ("SG") DMA mode in compliance with an AXI4 protocol. An SG DMA mode may be useful for offloading data movement tasks from a CPU of a host server 110. An AXI primary interface 211 for example may be configured as a crossbar, such as a shared-address, multiple-data ("SAMD") crossbar with parallel pathways for write and read channels, or a shared access mode (i.e., shared write data, shared read data, and single shared address pathways).

By using programmable fabric to provide DMA controller 214, the aforementioned DMA features and/or other DMA features may be user selectable. However, in another implementation, a hardware specific DMA or other bus controller may be used.

Primary interface 211 may be interconnected by way of bus 201 for electrical communication downstream to a switch 220-1, and control-register access primary interface 212 may be interconnected by way of bus 202 for electrical communication downstream to a switch 220-2. Continuing the above example, both of switches 220-1 and 220-2 may be configured for an AXI protocol in programmable fabric; however, in other implementations an AXI or other bus communication protocol may be used whether as dedicated hardware or in programmable fabric.

An output port of AXI switch 220-1 and an output port of AXI switch 220-2 are interconnected respectively by way of busses 203 and 204 for downstream, as well as upstream, electrical communication to a bus interface 231 and a control-register interface 232, respectively, of interface firewall 230. Bus interface 231 is a bus communication interface for data and other bus communications. Along those lines, bus interface 231 is configured for an AXI communication protocol in this example, such as previously described with reference to FIG. 3. Bus interface 231 may include a secondary interface ("SI") 231S, namely S_AXI, coupled to bus 203, and a primary interface ("MI") 231M, namely M_AXI, coupled to bus 205.

Output of M_AXI may be bussed by bus 205 to one or more secondary devices 250. Secondary devices 250 may be any of a variety of data processing devices, including but not limited to a GPU, a DSP, another FPGA, or other IC. Secondary devices 250 may be considered "undependable." In this example, an AXI secondary device 250-1 of secondary devices 250 is considered "undependable." By "undependable", it is generally meant that such a device may cause a system hang.

A downstream reset signal 233 sourced from downstream reset port 213 may be asserted to secondary device 250-1 to cause such downstream secondary device 250-1 to reset. Such a downstream reset signal 233 may be asserted responsive to a reset command from a host server 110, as described below in additional detail.

Interface firewall 230 may assert one or more interrupt signals and/or a reset signal of bussed signals 234 to DMA controller 214 to cause assertion of reset signal 233 to a selected one of secondary devices 250-1 to 250-$n$, for n a positive integer greater than zero. Assertion of a reset signal of bussed signals 234 may be synchronous with a clock signal (not shown for purposes of clarity).

For multiple secondary devices 250-$n$, reset signal 233 may be applied to reset all secondary devices 250 or may be selectively applied to a particular one or more of secondary devices 250 to be reset. Along those lines, optionally control select circuitry 235 may be used for selective application of a reset signal 233 to one or more of secondary devices 250 responsive to assertion of reset signal 233. Moreover, AXI networks connected to primary and secondary interfaces may be reset concurrently with assertion of reset signal 233.

Optionally, accelerator card 120 may include one or more "dependable" secondary devices 251. By "dependable", it is generally meant such a device is less likely to cause a system hang than an undependable device. A switch, such as switch 220-1 in this example, may have another output port interconnected by way of bus 206 for downstream, as well as upstream, communication with one or more "dependable" secondary devices 251, such as one or more AXI "dependable" secondary devices.

Again, for purposes of clarity by way of non-limiting example, one or more AXI protocol violations or other fault conditions may be in one or more kernels causing one or more system hangs in an SDSoC implemented system. An AXI interface firewall for direct memory interface ("DMA") transfers may be used to shield an AXI network 239 of an accelerator card 120 from downstream implications of such protocol violations or other fault conditions, which in turn may shield a host server 110 from a system hang.

In the above example, an AXI protocol is used for blocks within accelerator card 120 to communicate with one another, and this AXI protocol is different than a PCIe protocol used for communication between host server 110 and endpoint 210. If an "undependable" secondary device 250 "breaches" or "breaks" an AXI protocol, such a break in an AXI protocol can cause a system hang. Examples of protocol breaks may include: if a request for data is made, and no data is returned or not returned until after an unacceptable delay; or if data is requested in a particular form, and data is returned in a form different from the particular form requested. For example, a break in an AXI protocol may be due to an AXI protocol violation in a kernel that corrupts the operation of an AXI-based sub-system that a host DMA is trying to access.

In the past, if an accelerator card 120 had a break in protocol, then such accelerator card 120 would hang up which may result in a system hang of such accelerator card 120. In addition to not being able to access an accelerator card 120 stuck in a system hang for example, a host server 110 may be in a system hang state due to a system hang of such an accelerator card 120. Furthermore, it is more difficult to debug a system after a crash or other fatal system hang than if such a system can be maintained for purposes of debugging. Additionally, it may take a significant amount of time to recover a system from a crash or other fatal event caused by a system hang. For these and other reasons, avoiding a system hang due to a break in a protocol or other fault condition is useful.

As described below in additional detail, an interface firewall 230 may be configured to: detect a protocol break or other fault condition, isolate such protocol break or fault condition, and cause a controlled shut down of an accelerator card 120 or a portion of an accelerator card 120 affected by such a protocol break. After such a controlled shut down, recovery, such as by way of reset, may be allowed for such accelerator card 120 or portion thereof. A controlled shut down of an accelerator card 120 or affected portion thereof may include notifying a host server 110 of such impeding shut down. Additionally, by having a controlled shut down, a recovery mode may automatically be invoked. In short, a sub-system that breaks protocol may be isolated out, shut down, reset, and allowed to recover for continued operation. Along those lines, rather than entirely relying on an external control signal from a host, if not crashed, as a stimulus for initiating a recovery procedure, an interface firewall in response to detecting an error condition, such as on a primary interface interconnected to a secondary device, may initiate a recovery procedure.

FIG. 2-2 is the same as FIG. 2-1, except in the example of FIG. 2-2, a protocol break or other fault is described as occurring downstream of an interface firewall 230 due to a sub-system, such as a secondary device 250-1. Along those lines, in this example bus 205 is generally indicated as having no bussing capability, though in actuality this may still be a bidirectional bus, to indicate a blocked status. For purposes of contrast, busses 201-204 and optional bus 206 are still generally indicated as bidirectional busses. The distinction is used to indicate that traffic flowing downstream in accelerator card 120 to a dependable or protocol trusted secondary device, such as a memory for example, can have traffic flowing upstream without interface firewall 230 regulation. In contrast, downstream traffic to an undependable secondary device does need to be interface firewall 230 regulated as upstream devices are considered protocol dependable. Upstream traffic from an undependable secondary device 250-1 is to be interface firewall 230 regulated. This regulation or firewalling of upstream traffic flow, or secondary-to-primary traffic flow, by interface firewall 230 is to prevent or mitigate against damage caused by a system hang due to a protocol break or other fault in such upstream traffic from an undependable secondary device 250.

Generally interface firewall 230 operates as follows. When communication traffic complies with an AXI protocol, such AXI compliant traffic is allowed to pass through interface firewall 230. However, interface firewall 230 in response to detecting a protocol break, such as a bus protocol violation in a driver in kernel 242 in upstream bus traffic of an undependable secondary device 250-1 for example, trips or transitions into an error mode. In an error mode, interface firewall 230 blocks any further transactions with at least the undependable secondary device 250-1 causing such a protocol violation. A primary interface side transfer that triggers a block is not propagated to a secondary interface of interface firewall 230. Once blocked, a secondary interface of interface firewall 230 may autonomously issue protocol-compliant responses to any or all incomplete or partially-incomplete outstanding transactions for such blocked secondary device.

In an example, all secondary devices 250 may be blocked from any further transactions by interface firewall 230 responsive to a protocol break detected by interface firewall 230 in a transaction or other communication from a secondary device 250-1 to firewall 230. Again, once blocked, a secondary interface of interface firewall 230 may autonomously issue protocol-compliant responses to any or all incomplete or partially-incomplete outstanding transactions for such blocked secondary devices.

Along those lines, currently in-process or "in-flight" transactions may be allowed to complete by interface firewall 230, even though data obtained from such in-flight transactions may be sourced from a protocol break, meaning such obtained data may be "garbage" or otherwise invalid. In other words, if a protocol dependable, or trusted to be protocol dependable, device of host system 200 is in communication with an undependable secondary device 250-1 and such undependable secondary device 250-1 breaks protocol as detected by interface firewall 230, then in-flight transactions from such protocol dependable primary device are allowed to complete even though "garbage" data may be returned for requested data.

Along those lines, interface firewall 230 may be configured to keep track of all in-flight or other outstanding transactions. A clock signal (not shown for purposes of clarity) may be provided to components of an accelerator card 120. Interface firewall 230 may be configured to insert a read invalid or bad data flag to accompany garbage data from an undependable secondary device or to insert a read invalid or bad data flag to accompany dummy data provided from interface firewall 230. A bad data flag is to alert a primary device, such as host server 110, that such returned data is corrupted or otherwise invalid. However, a return of garbage, dummy or otherwise invalid data may avoid a system hang, which might otherwise be caused by such a protocol violation. With respect to a write to an undependable secondary device 250-1 that breaks protocol with respect to such a write, in response to interface firewall 230 detecting such a write protocol break, interface firewall 230 may be configured to return an invalid write flag to a primary device requesting such write to such undependable secondary device 250-1. This invalid write flag is to alert a primary device that such write did not occur in accordance with an AXI protocol. However, by observing an AXI protocol indicating that something bad has happened with assertion of an invalid write flag or a bad data flag for example, interface firewall 230 may prevent a system hang.

For an invalid write flag or a bad data flag, a host server 110 or other primary device may respond to either of such flags as a type of exception condition. Again, this avoids a system hang by such a host server 110. Moreover, for exception handling, a host server 110 may be configured to initiate a diagnostic routine to determine a cause of such an exception condition. Along those lines, interface firewall 230 may have a control-register interface 232 that can be interrogated by host server 110 to obtain information for diagnostic purposes, as well as to make a determination as to whether or not to initiate a recovery procedure.

A control-register interface 232 may have registers 232R to store transactions that have occurred, as well as what happened in-flight with respect to such stored transactions. In this example, control-register access primary interface 212 and control-register interface 232 may both be configured for an AXI4-Lite protocol.

A control-register interface 232 may store transaction information to indicate that at a particular transaction a particular fault was detected. Such a detected fault may be a protocol break; however, other types of faults may be detected and traced. For example, a fault may not technically be a protocol violation, but such a fault may cause excessive wait time for a response. Thus, though protocol breaks have been described for purposes of clarity and not limitation, interface firewall 230 may additionally be configured to detect other types of faults, which may not be protocol breaks, but which may lead to system hangs, such as excessive wait times. Interface firewall 230 may be configured to detect such faults and process such faults same or similar to protocol breaks to avoid system hangs.

In this example, interface firewall 230 includes optional trace memory or other local storage 238. Trace storage 238 may be configured to store a last N number of transaction, such as for example a last 100 transactions and/or other activities or acts before a point where a protocol violation was detected. This is just an example for N, and values other than 100 may be used in other examples.

At this point, it should be appreciated that information upstream of undependable secondary devices 250 may remain uncorrupted. Therefore, upstream communication from an undependable secondary device 250-1 between a host server 110 and an accelerator card 120 may still be "alive" or not be ruined by a protocol violation or other fault. Thus, only communication or other activity downstream of interface firewall 230 is potentially corrupted or otherwise ruined or blocked or otherwise jammed up.

For this example, interface firewall 230 may include a fault store 236, such as may be implemented in a lookup table of programmable fabric for example. Fault store 236 may include all possible AXI protocol violations as well as all other possible fault conditions, including without limitation excessive wait times. Having a collection of all possible fault conditions may be used for purposes of detection of one or more of such fault conditions by interface firewall 230. Once a fault condition is detected by interface firewall 230 such as by a match found in fault store 236, interface firewall 230 may be configured to respond to such detected fault condition in a manner to prevent propagation of such fault condition to a downstream side of such interface firewall 230 in a manner in which a downstream system hang may result if not firewalled off.

In an implementation, interface firewall 230 may be configured to check for a fault condition in-flight, so as to limit latency due to passing through interface firewall 230. In this configuration, interface firewall 230 may prevent a fault condition from propagating downstream from interface firewall 230 though with less imposition of delay. However, in this example, interface firewall 230 includes a buffer 237, such as a FIFO or other buffer, to store traffic from undependable secondary devices 250 for interrogation for a fault condition in fault store 236. If there is not a fault in buffered traffic, such buffered traffic is released for downstream propagation from interface firewall 230. If, however, interface firewall 230 detects a fault condition in buffered traffic in buffer 237, then previously described procedures may be invoked by interface firewall 230.

Figure 4:
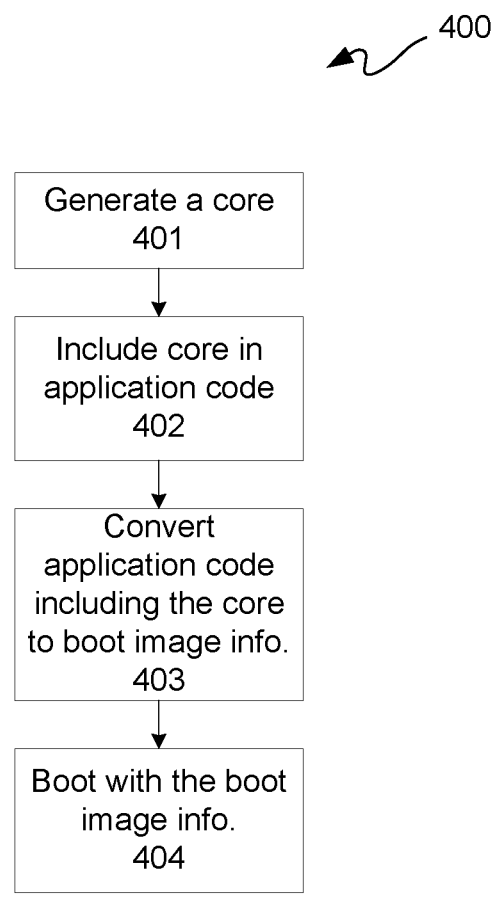
FIG. 4 is a flow diagram depicting an exemplary design and instantiation flow.

FIG. 4 is a flow diagram depicting an exemplary design and instantiation flow 400. Design and instantiation flow 400 is further described with simultaneous reference to FIGS. 1-4. At 401, a core for an interface firewall 230 may be generated. A GUI 300 may be used for generation of such a core, where such GUI is included as part of electronic computer-aided design (ECAD) or electronic design automation (EDA) software to provide a state machine, as described below in additional detail. Generation of circuits, including state machines, from inputs such as may be provided via a GUI is known, and so specific details regarding such state machine generation is not described for purposes of clarity, as GUI 300 informs such software.

At 401, a control-register interface 232 for such interface firewall 230 may be configured to have timeout limits for a set of transactions, to control read and write unblock requests, and to control soft block requests. One or more of these features may be included as part of interface firewall 230 to be instantiated in programmable fabric.

At 402, a core generated at 401 may be included in or added to application code 101. A core in this example in effect may be a program language description of an interface firewall 230. This program language description of an interface firewall 230 may be processed through an IDE 102 at 403 to convert application code, including such core, to obtain a configuration bitstream as part of boot image information 121 for instantiation of an interface firewall 230 in programmable fabric. At 404, an accelerator card 120 may be booted with boot image information 121 in part to instantiate in programmable resources 122 an interface firewall 230 as a functional hardware circuit 123.

To recapitulate, an interface firewall core may be instantiated to propagate traffic from secondary to primary interfaces thereof and propagate responses back from such primary interface. While propagating traffic and responses, such interface firewall actively checks for certain potentially-fatal protocol violations in response transfers, and blocks each offending transfer and any further transfers from an offending device from propagating. Blocking offending transfers protects an upstream network, allowing such an upstream network to keep operating in the event of a downstream failure. A control-register interface on such interface firewall can then be used to read information about error status and to initiate recovery of such offending device.

Figure 5:
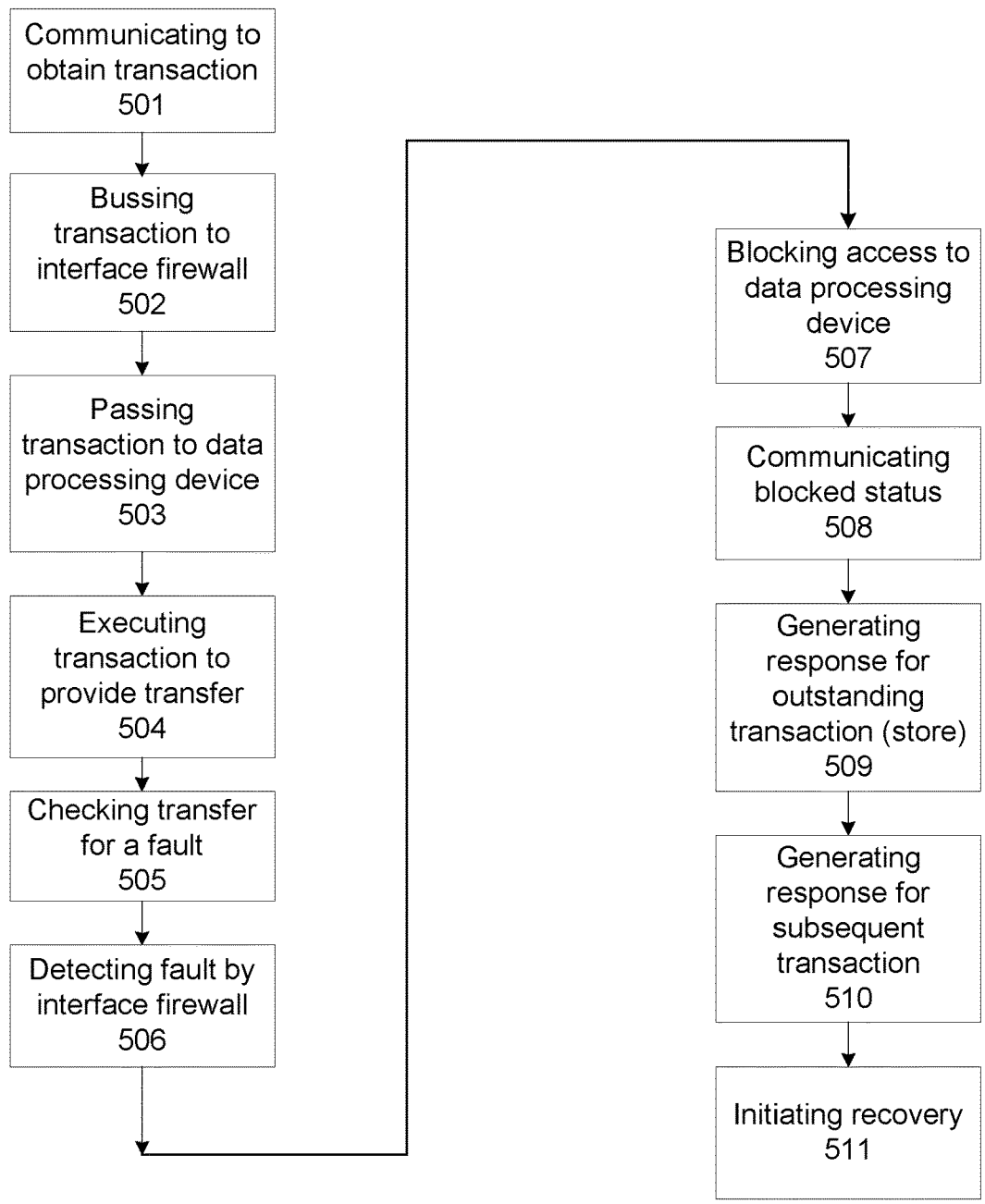
FIG. 5 is a flow diagram depicting an exemplary operational flow of an interface firewall.

FIG. 5 is a flow diagram depicting an exemplary operational flow 500 of an interface firewall, such as interface firewall 230 as previously described. Operational flow 500 may be used for protection of a bussed network. Operational flow 500 is further described with simultaneous reference to FIGS. 1-5.

At 501, there may be communication from a host device to an access controller via a communication bus to obtain a current transaction. For example, a host server 110 may communicate to a DMA controller 214 via a bus interface 115 to obtain one or more current transactions. Communicating at 501 may be between interface firewall 230 and a plurality of data processing devices 250 including a data processing device 250-1 for example.

At 502, such one or more current transactions may be bussed to an interface firewall coupled for bussed communication with such an access controller. For example, one or more current transactions may be bussed from DMA controller 214 to interface firewall 230.

At 503, one or more current transactions may be passed from an interface firewall to a data processing device coupled for communication with such interface firewall. For example, one or more current transactions may be passed, namely not blocked, from an interface firewall 230 to one or more target secondary devices 250 for such one or more current transactions.

At 504, such one or more current transactions may be executed, including without limitation attempting to be executed, by one or more data processing devices to provide one or more corresponding transfers, including without limitation one or more attempted or anticipated transfers. For example, one or more current transactions may be executed by one or more of secondary devices 250 to provide one or more corresponding transfers to interface firewall 230. Furthermore, at 504 current transactions may be executed to return corresponding transfers without faults for a plurality of data processing devices. In other words, some properly operating data processing devices may not be blocked and continue to operate though a fault is detected in an improperly operating data processing device of such plurality.

At 505, interface firewall 230 may check such transfer for a fault associated with such transfer. For example, interface firewall 230 may check for a bus protocol violation or a timeout.

At 506, a fault associated with such transfer may be detected by an interface firewall. For example, interface firewall 230 may detect a bus protocol violation or a timeout associated with a transfer. After interface firewall 230 trips responsive to a detection, interface firewall 230 starts isolation process. This isolation process may include signaling a processor of a host device for example by way of sending an interrupt to such processor. This interrupt informs a processor that a fault has occurred.

For this AXI example, interface firewall 230 actively checks for certain potentially fatal system hangs in each AXI response transfer received on "R" and "B" channels of an MI of such interface firewall. When any fault condition(s) of those configured in interface firewall 230 is/are detected on an R or B channel of such an MI 231M, interface firewall 230 blocks further read and write transfers between SI and MI of interface firewall. Separate firewall blocking conditions may be imposed for read and write faults. Moreover, detecting at 506 by interface firewall 230 may be for a timed out state for a fault associated with a current transaction.

Responsive to detection of a fault at 506, at 507 an interface firewall may block access to a data processing device associated with such fault. For example, interface firewall 230 may block access to a data processing device 250-1 of data processing devices 250, where such data processing device 250-1 had a transfer with a bus protocol violation or a timeout. In this example, if a block access is triggered by a bus protocol violation fault in a response transfer, such transfer exhibiting the violation is not propagated from MI to SI of interface firewall 230. A block condition or status may be indicated via control-register interface 232 and/or via non-AXI error output signals, such as separate read and write MI error signals (e.g., mi_r_error and mi_w_error) of bussed signals 234, both of which error signals may remain sticky until a block access is cleared. These error signals are examples of service interrupts that may be sent to a processor of a host device 110.

In this example, one or more faults causing a blocked status may be readable via control-register interface 232, and register "score boarding" (i.e., either a 0 or 1 for each fault) of such one or more faults may remain unchanged until after a corresponding blocked access is cleared. For example, during a first clock cycle in which any read or write fault is triggered, a fault status register of registers 232R of control-register interface 232 may capture all checks-detections that are asserted during that cycle, but no subsequently triggered checks-detections, within a corresponding read or write cycle, will change the value of a read/write field of such fault status register. In this example, only problematic conditions observed on an MI 231M of interface firewall 230 trigger blocked accesses, and no problematic conditions observed on an SI 231S of interface firewall 230 trigger blocked accesses.

Once access to a secondary device is blocked, interface firewall 230 may autonomously issue protocol-compliant responses for corresponding transfers on an SI thereof for each outstanding (read or write) transaction. Ordering among transaction responses per thread may remain protocol-compliant, but ordering among multiple threads may be non-deterministic.

In this example, subsequent command transfers received on an SI 231S of interface firewall 230 during a blocked access period may be appended to an internal command queue and responded to in turn after recovery so upstream primary devices may provide subsequent commands after a blocked access is triggered. However, no commands, or accompanying write-payload transfers, received prior to an unblock request get propagated to MI 231M of an interface firewall 230.

At 508, an interface firewall may communicate a blocked status for data processing device to other devices expecting one or more transfers from such data processing device. In another example, an interface firewall may broadcast such a blocked status to all primary devices on bussed network or all primary devices previously capable of communicating with such data processing device. At 508, such blocked status may be read or write specific. Interface firewall may provide either a read blocked status or a write blocked status for a blocked status respectively for a read transaction and a write transaction for a current transaction. Furthermore, at 508 interface firewall 230 may communicate a blocked status for a data processing device having reached a timed out state. While such blocked status may be communicated to a host device 110, such block status may be communicated to other devices external to expansion card 120 in direct or indirect communication with such expansion card as part of bussed network 200. For a plurality of data processing devices, at 508 a remainder of properly operating data processing devices of such plurality may be allowed to continue to operate without blocking access while maintaining blocking of access to an improperly operating data processing device associated with a detected fault.

At 509, interface firewall 230 may generate a protocol compliant response for a current transaction outstanding for a data processing device with a blocked status. Such blocked status may be for a fault being a bus protocol violation. At 509, a control-register interface 232 may be used to provide an indication of a blocked status, such as via error signals mi_r_error and mi_w_error of bussed signals 234. Furthermore, such a control-register interface 232 may be used at operation 509 to store information regarding cause of a blocked status, such as registered or otherwise stored such as in control-register interface 232.

At 510, interface firewall 230 may generate a protocol compliant response for a subsequent unblocked transaction. Such blocked status may be for a fault being a bus protocol violation. For example, a transaction, not a current transaction outstanding prompting a blocked status, but a subsequent unblocked transaction may be received from a primary device to an SI 231S of interface firewall 230. Interface firewall 230 may be configured to generate a response to such subsequent unblocked transaction, though this response may be a dummy response, through protocol compliant, with a flag indicating same.

At 511, recovery of a blocked access data processing device may be initiated. In this example, at 511 access to stored information, such as store in registers 232R for example, may be provided via control-register interface 232. This stored information may be useful for diagnosing a cause of a fault and identifying a data processing device at fault. A reset of a data processing device having caused a fault may be initiated at 511. Such reset may be initiated from control-register interface 232 for a reset of such data processing device for recovery thereof. Notably, interface firewall 230 may avoid being reset, and continues such interface firewall 230 continues to operate to conduct transfers from properly operating data processing devices and continues to operate for purposes of recovery of an improperly operating data processing device.

When a host processor sees a condition flag provided via a service interrupt, such service interrupt may cause such host processor to go to a driver or OS to see what to do. In this example, a driver for an accelerator card 120 informs a host processor to interrogate interface firewall 230 to find a fault condition. When a driver or API sees interface firewall 230 is tripped, such driver or API via a host processor tries to obtain as much information as it can from interface firewall 230 regarding what caused such tripped condition or blocked access. Based on such information obtained from interface firewall 230, a host processor under direction of a driver or API may take corrective action.

Corrective action can include "killing" an app trying to access a secondary device having prompted a fault. Corrective action can include a reset of a secondary device causing a problem or a group of secondary devices in which a problem is caused or an entire expansion card having a problem.

Figure 6:
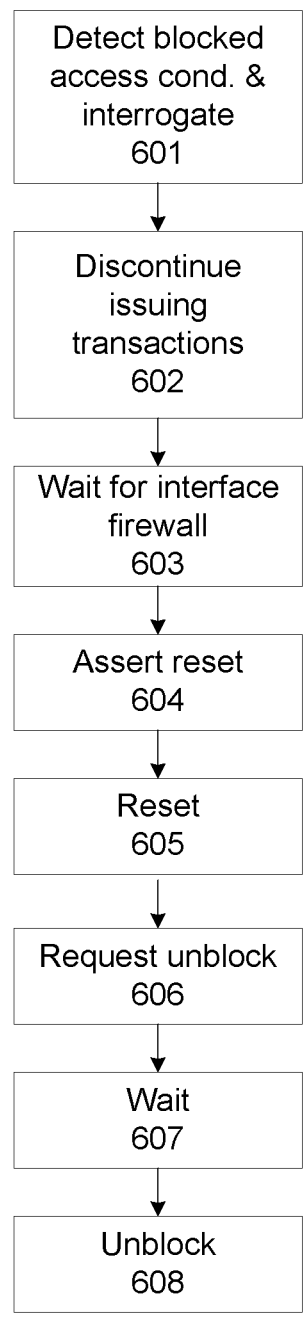
FIG. 6 is a flow diagram depicting an exemplary recovery flow.

FIG. 6 is a flow diagram depicting an exemplary recovery flow 600.

Recovery flow 600 may be used for one or more operations 511 of FIG. 5. Recovery flow 600 is further described with simultaneous reference to FIGS. 1-6.

At 601, a blocked access condition, whether a blocked read and/or write condition, is detected by a host server 110, such as by a host processor thereof. Detection at 601 may arise by either sampling fault status bits of a fault status register of registers 232R for an MI 231M of interface firewall 230 or responding to an interrupt triggered by an MI read or write error output signal, namely mi_r_error or mi_w_error, from interface firewall 230. However, because not even one clock cycle of a fault may reach a trusted side of an interface firewall 230, a host server 110 is operational to institute diagnostic and recovery operations. Moreover, at 601, a host server 110 may interrogate registers 232R of a control-register interface 232 of interface firewall 230, as previously described.

At 602, any further issuing of both read and write transactions into a data interface, such as for example an SI 231S, of interface firewall 230 is discontinued, such as by a host server 110. Optionally, a wait may be imposed for any latency to lapse for any and all in-flight transactions to reach such SI 231S of interface firewall 230. This optional wait may be performed regardless of whether either write or read traffic remains unblocked. Even though an SI 231S is described for purposes of clarity by way of non-limiting example, in another example issuing of any transaction to a primary interface of interface firewall 230 may be discontinued. Furthermore, in another example, issuing of any transaction to both a primary interface and a secondary interface of interface firewall 230 may be discontinued.

At 603, a wait state for interface firewall to be ready may be used. A host server 110 may wait for both read and write busy bits to become de-asserted in a fault status register of registers 232R for an MI 231M of interface firewall 230. This wait may be performed regardless of whether either write or read traffic remains unblocked.

At 604, a reset signal for at least each blocked secondary device downstream of an MI 231M of interface firewall 230 may be asserted by a host server 110, such as for a reset of at least a blocked secondary device 250-1 in the above example causing or having a problem. Along those lines, a release of a downstream reset 233 may be performed at 605 in response to such reset signal assertion. Optionally, a wait may be imposed for any latency to lapse for any and all outstanding R or B channel response transfers to reach such MI 231M of interface firewall 230. Waiting for one or more downstream secondary devices 250 to recover from reset may or may not be used.

At 605, a reset may be performed by providing a reset signal to a reset port of a secondary device. However, in another example, partial or complete dynamic reconfiguration of programmable fabric may be used. For example, a secondary device instantiated in programmable fabric may be reconfigured or re-instantiated in whole or in part in programmable fabric for a reset. Reset may be for just a portion of a secondary device using dynamic reconfiguration for a reset, namely a partial dynamic reconfiguration of a secondary device. By dynamic reconfiguration, it is generally meant an FPGA or other integrated circuit with reconfigurable programmable fabric continues to operate while reconfiguration is performed. However, a driver or API in host server 110 may make sure no other app tries to access an expansion card during reset by way of dynamic reconfiguration. A software app, firmware or hardware flaw in mapping may be the cause of a faulty condition, so any of a variety of corrective actions for recovery may be taken responsive to diagnostic information.

At 606, a request by a host server 110 to interface firewall 230 to unblock writing to an unblock control register of registers 232R for an MI 231M of interface firewall 230 may be made. This request is effectively to remove a blocked access of a currently blocked secondary device 250-1 in the above example. This is to effectively allow all upstream primary devices to be able to inquire as to whether transactions can flow again. At 607, in response to such request at 606, a write and a wait for such a write to an unblock control register of registers 232R to complete may be used. At 608, issuing new transactions to an SI 231S of interface firewall 230 may resume by interface firewall 230 positively responding to such unblock request(s) and by unblocking access.

To recapitulate, a problem with a secondary device is detected by an interface firewall. After detection, a problem associated with such secondary device may be cleared, and such secondary device may be reset. Furthermore, all secondary devices in a grouping of undependable secondary devices may be isolated, or just a sub-system may be isolated by way of building a tree for isolation of one or more leaves.

Furthermore, even though the above-example was for untrusted secondary devices, the other direction may likewise be implemented. For example, secondary devices 250 may be trusted, and host server 110, or a component thereof, may be untrusted. For example, transactions sourced from a USB host can have a wired connection thereto disconnected or a link condition to cause a primary to exit. This loss of connection or link may create a timeout, which an interface firewall can treat as a fault though on a primary side. In a reverse trust configuration, control-register interface 232 may be on a secondary input side, as information is read from control-register interface 232 same is to be on a trusted side of a net.

Furthermore, a back-to-back configuration may be used. For example nets on either side of an interface firewall with primary interfaces and secondary interfaces may be used, and thus there can be multiple nets with interface firewall isolatable subnets.

Additionally, there can be more than one network connection. For example, in a data center an expansion card may have more than one network connection. For purposes of clarity by way of non-limiting example, an accelerator card or other expansion card may have 4 net connections with 4 corresponding interface firewalls in such same card. In other examples, a tree of interface firewalls or one interface firewall for all 4 net connections may be used.

Even though an interface firewall core for instantiation in programmable fabric of an integrated circuit, such as an FPGA, was described, such an interface firewall could be in a hard block in FPGA, could be in an ASIC, or could be done in software. In the above example, a finite state machine ("FSM") may be used.

Figures 1, 7:
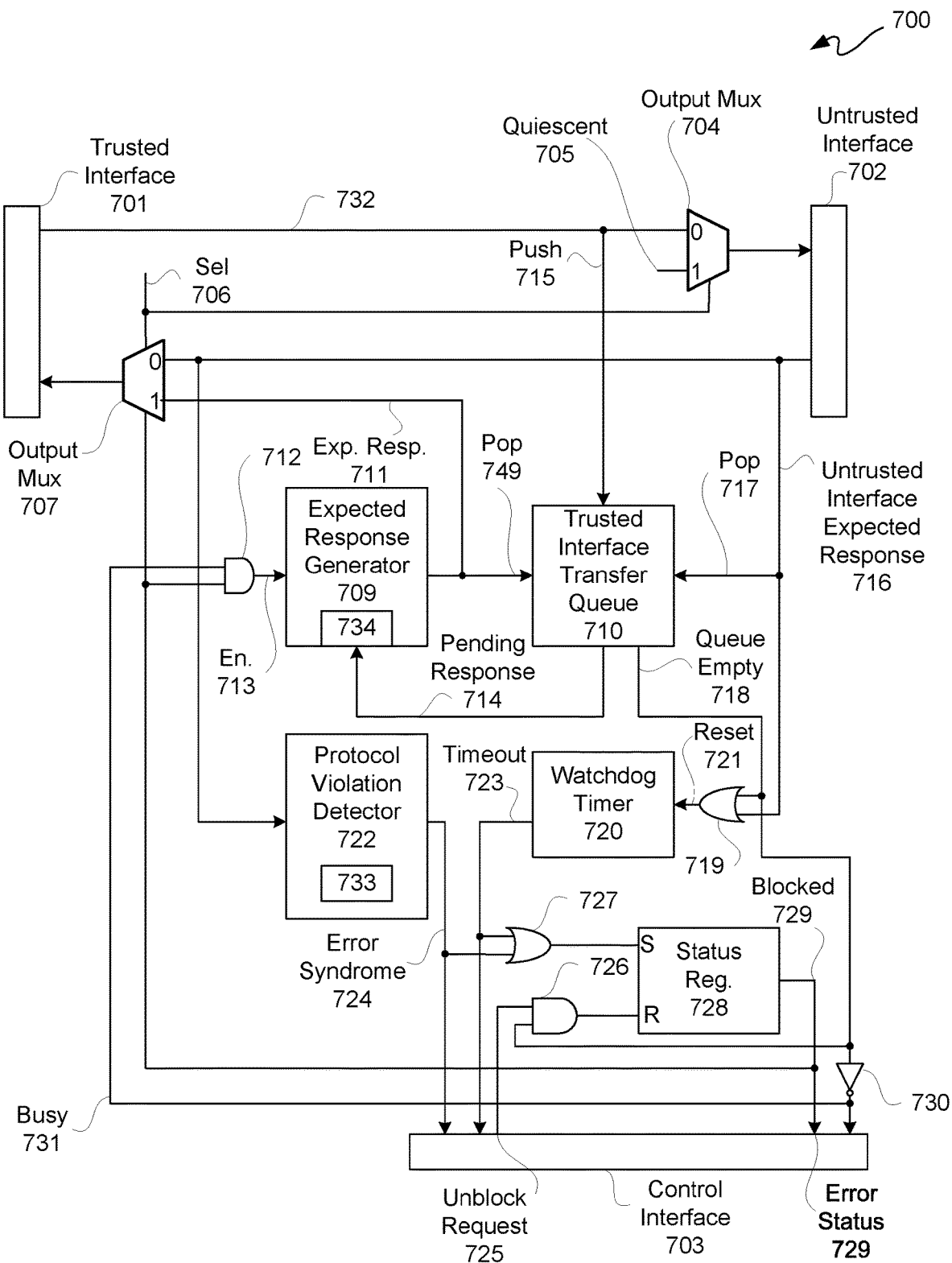
Figures 2, 7:
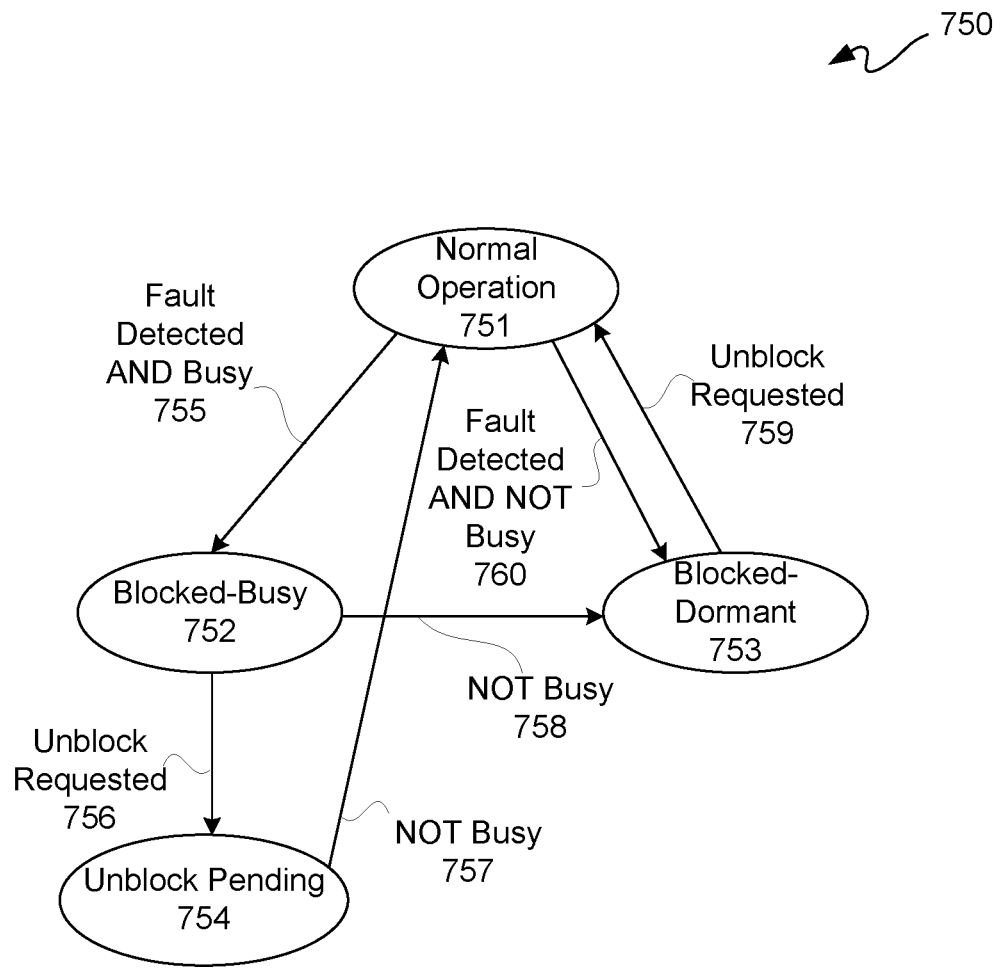

FIG. 7-1 is a block-schematic diagram depicting an exemplary interface firewall circuit ("interface firewall") 700, and FIG. 7-2 is a state diagram depicting an exemplary ("finite state machine") FSM 750. FSM 750 reflects operations of interface firewall 700, and interface firewall 700 may be used in an interface firewall 230 of FIG. 2-1. Interface firewall 700 and FSM 750 are further described with simultaneous reference to FIGS. 1 through 7B.

Interface firewall 700 includes a "trusted" interface 701, an "untrusted" interface 702, and a control interface 703 in accordance with the above description. Interfaces 701 and 702 may be used to monitor and regulate data transfers that propagate between such interfaces. Continuing the above example, both of interfaces 701 and 702 may be of type AXI, and accordingly traffic flow may include read and write commands and data packets that include an AXI protocol. In other examples, an interface firewall can otherwise monitor and regulate data transfers of different protocols.

In this example, trusted interface 701 is an AXI "slave" or secondary interface, and untrusted interface 702 is an AXI "master" or primary interface. Interface firewall 700 may be configured to monitor and guard against protocol violations or other problems caused by a "secondary" device connected to untrusted or primary interface 702. In another example, trusted interface 701 can be a master or primary interface, and untrusted interface 702 can be a secondary interface. In such other example, interface firewall 700 may monitor and guard against protocol violations or other problems caused by a primary device connected to an untrusted or secondary interface. In yet another example, both interfaces 701 and 702 of interface firewall 700 can simultaneously act as both trusted and untrusted interfaces, with one being a primary type interface and the other being a secondary type interface, and vice versa, from transaction-to-transaction, and in such example interface firewall can monitor and guard against protocol violations or other problems caused by either or both a primary device connected to a secondary interface or a secondary device connected to a primary interface.

Upon power-up or circuit reset, interface firewall 700 enters normal operation state 751. Upon power-up or circuit reset, interface firewall 700 status register 728 may be initialized to unblocked (0) state where blocked signal 729 is not asserted, which indicates interface firewall 700 is in normal operation state 751, which may be indicated by a blocked or error status signal 729 of control interface 703 not presently being asserted.

While in normal operation state 751, transfers and/or input transitions 732 received on trusted interface 701 may be propagated through untrusted interface output multiplexer ("output mux") 704 to outputs on untrusted interface 702, and transfers and/or input transitions ("untrusted interface expected response") 716 received on untrusted interface 702 may be propagated through trusted interface output multiplexer ("output mux") 707 to outputs on trusted interface 701. Along those lines, a select signal 706, which is sourced from protocol violation detector 722, may be provided to each of output muxes 704 and 707 indicating data transfer in a normal operation state 751 (e.g., select signal 706 set to a logic 0), in comparison to a block state (e.g., select signal 706 set to a logic 1), such as blocked-busy state 752 or blocked-dormant state 753. Any queries made to control interface 703 by a host device may indicate that error status or block signal 729 is de-asserted, which may indicate to such host device that interface firewall 700 is in normal operation state 751.

When any transfers 732 are received on trusted interface 701 for which corresponding responses 716 are expected from untrusted interface 702, such transfer events 732 may be pushed 715 into trusted interface transfer queue 710. As expected responses 716 are received on untrusted interface 702 each may be popped 717 onto trusted interface transfer queue 710, and each corresponding previously-queued transfer event may be popped off via pending response signal 714 from trusted interface transfer queue 710 to expected response generator 709. When trusted interface transfer queue 710 is empty, trusted interface transfer queue 710 asserts a queue empty signal 718 to indicate that there are no pending responses expected queued by any device connected to trusted Interface 701 from any device connected to untrusted interface 702.

Untrusted interface protocol violation detector 722 monitors inputs received on untrusted interface 702. When any of implemented violation condition or conditions, such as may be stored in a lookup table 733 for example, are satisfied, such as a match between at least one condition stored in lookup table 733 and an untrusted interface expected response 716, firewall status register 728 may be immediately set, such as responsive to output of an OR gate 727, to a "blocked-busy" state 752 or a "blocked-dormant" state 753.

Transition from normal operation state 751 to blocked-busy state 752 in this example is responsive to protocol violation detector 722 detecting a fault and assertion of a busy signal 731, as indicated by "Fault Detected AND Busy" transition 755. Transition from normal operation state 751 to blocked-dormant state 753 in this example is responsive to protocol violation detector 722 detecting a fault and no assertion of a busy signal 731, as indicated by "Fault Detected AND NOT Busy" transition 760.

For detection of a match, protocol violation detector 722 may assert error syndrome signal 724 as an input to OR gate 727 to set status register to a blocked state. Error syndrome signal 724 may further be provided to control interface 703, such as to alert a host device of such error or blocked state. States 752 and 753 are hereinafter referred to a "Blocked" state meaning either of such states.

While in a Blocked state, any further transfers and/or input transitions received on trusted interface 701 are not propagated through to untrusted interface 702. In this example, such blocking of propagation may be responsive to select signal 706 selecting quiescent signal 705 for output from output mux 704.

Furthermore, while in a Blocked state, untrusted interface 702 outputs are effectively forced into a quiescent output state, such as responsive to select blocked signal 729 being asserted as a select override signal to output mux 707. In this example, an AND gate 712 is coupled to receive busy signal 731 and blocked signal 729. Output of AND gate 712 may assert an enable or activation signal 713 for activation of expected response generator 709. For both of busy signal 731 and blocked signal 729 being asserted, namely both logic 1s in this example, for a transition 705 from normal operation state 751 to blocked-busy state 752, expected response generator 709 may be activated to generate an expected response 711.

Expected response 711 may be for a current pending response 714 received by expected response generator 709, which may be popped 749 onto trusted interface transfer queue 710. Expected response generator 709 may include a lookup table 734 of stored expected responses from which to select a response formatted in accordance with an expected response which may be flagged as a dummy response, using a current pending response 714 as an index into such table. An expected response 711 output may be provided to a port of output mux 707, and in a Blocked state, such expected response 711 may be output from output mux 707, such as previously described. Additionally, such expected response 711 may be popped onto trusted interface transfer queue 710 for determining the next expected response to return to trusted interface 701.

While in a Blocked state, any further transfers and/or input transitions received on untrusted interface 702 are not propagated through to trusted Interface 701. In this example, input transitions received on untrusted interface 702 which trigger a protocol violation themselves do not propagate to outputs on trusted interface 701, rather an expected response 711 is sent instead.

In this example, trusted interface 701 is pipelined so that a detected protocol violation may be applied in time to prevent trusted interface 701 outputs from changing. In another example, a detected protocol violation can be applied combinatorially to gate off an associated errant output transition during the same cycle. This latter example may be used in an instance where pipeline latency is not desirable.

In addition to monitoring for protocol violations, a watchdog timer circuit ("watchdog timer") 720 monitors for one or more timed-out conditions. If an expected response is not received on untrusted interface 702 via expected response signal 716 within an allotted amount of time, watchdog timer 720 may assert a timeout signal 723. In this example, a host device sets an allotted time via control interface 703, though such setting path is not illustratively depicted for purposes of clarity and not limitation. In other examples, one or more allotted times can be set by other means, including static configuration of interface firewall 700 or other control signal inputs.

In this example, watchdog timer 720 is disabled, namely held in reset, while trusted interface transfer queue 710 is empty responsive to assertion of queue empty signal provided to an input of OR gate 719. Output of OR gate 719 is a reset signal 721 to watchdog timer 720.

Watchdog timer may also be reset whenever an expected response 716 is received on untrusted interface 702 within an allotted time for same. Along those lines, a flag bit of expected response 716 may be provided to another input of OR gate 719 for asserting reset signal 721 to reset watchdog timer 720. Along those lines, even though single lines are illustratively depicted in FIG. 7-1, such single lines may represent a single signal line or a signal bus of multiple signal lines, as applicable for the description hereof.

When a timed-out condition is detected by watchdog timer 720, timeout signal 723 is asserted. As timeout signal 723 is provided to OR gate 727 and output of OR gate 727 is a set signal for firewall status register 728, firewall status register 728 is set to a Blocked state responsive to assertion of timeout signal 723.

While in a Blocked state, if trusted interface transfer queue 710 is empty as indicated by assertion of queue empty signal 718, then interface firewall 700 is in a blocked-dormant state 753, awaiting an unblock request 725 to be received as asserted by a host device and received via control interface 703. Unblock request signal 725 and queue empty signal 718 are both provided to inputs of AND gate 726. When both of signals 718 and 725 are asserted, output of AND gate 726, which is provided as a reset to status register 728, is asserted to reset status register 728. Reset of status register 728 may be used to transition interface firewall 700 from blocked-dormant state 753 back to normal operation state 751 responsive to an unblock requested transition 759.

While in a Blocked state, if trusted interface transfer queue 710 is not empty as indicated by non-assertion of queue empty signal 718, then interface firewall 700 is in a blocked-busy state 752. A blocked-busy state 752 indicates that there is still one or more pending response transfers expected by devices connected to trusted interface 701, which are to be completed before interface firewall can be restored back to normal operation state 751. In this example, queue empty signal 718 is provided to an input of inverter or NOT gate 730. Output of inverter 730 is provided as busy signal 731 to an input of AND gate 712, as previously described.

During a blocked-busy state 752, expected response generator 709 issues one or more response transitions, namely one or more expected responses 711, onto outputs of trusted interface 701 via output mux 707, as previously described. Along those lines, expected response generator 709 may be held active to autonomously complete, in a protocol-compliant manner, all outstanding transactions, which remain stored in trusted interface transfer queue 710, until all such pending responses are unloaded via pending response signal 714.

As one or more pending responses to each outstanding transaction are completed, trusted interface transfer queue 710 is popped for each completed response. When trusted interface transfer queue 710 becomes empty, expected response generator 709 becomes deactivated responsive to assertion of queue empty signal 718 inverted by inverter 730 for providing a de-asserted busy signal 731 to AND gate 712 to de-activate enable signal 713.

From a blocked-busy state 752 responsive to de-assertion of busy signal 731, FSM 750 or interface firewall 700 transitions from blocked-busy state 752 to blocked-dormant state 753 responsive to a NOT busy 758 transition. Busy signal 731 may be provided to control interface 703. A blocked-dormant state 753 may be indicated by querying control Interface 703 and sampling busy signal 731 status, namely as to whether busy status is de-asserted.

During operation, a host device may be made aware of changes in firewall error status. In this example, this can be achieved in two ways. A host device can periodically query control Interface 703 and detect when error status signal 729 changes, such as becomes asserted. Otherwise, blocked output signal 729 from firewall status register 728 can be connected to a host device as an interrupt request. In other examples, notification of an error condition can be achieved in one or more of these and/or other ways, the latter of which may include interface firewall 700 issuing a write to a location local to a host device, such as via a PCIe channel. In another example, a host device can interrogate control interface 703 to examine for example error syndrome bits of error syndrome signal 724 and/or timeout signal 723. Error syndrome bits may indicate the nature of a violation that caused an error, including distinguishing between a protocol violation and a timed-out condition.

Once a host device, including without limitation a host system, becomes aware of a firewall error condition, such a host device may elect to follow a prescribed recovery procedure, such as in a driver or API, allowing interface firewall 700 to be restored back to normal operation state 751. In this example, the procedure is as follows. A host device takes actions that will cause any and all primary devices connected to trusted interface 701 to discontinue issuing any and all new transactions through interface firewall to any and all secondary devices connected to untrusted interface 702.

A host device then continues to periodically query control interface 703 waiting for status of busy signal 731 to become de-asserted, indicating that: there are not any remaining pending response 714 transfers expected by devices connected to trusted interface 701, and interface firewall is in blocked-dormant state 753. Then a host device may take actions that will cause any and all devices connected to untrusted interface 702 to undergo a reset operation. Resetting of any and all devices connected to untrusted interface 702 may be used to ensure that: none of such untrusted interface 702 downstream connected devices will attempt to issue any further responses; and any and all of such untrusted interface 702 downstream connected devices return to a state in which each is ready to receive new transactions. Then, a host device may write to control interface to request an unblock, namely assertion of unblock request signal 725.

When an unblock request 725 is received on control interface 703 provided, however, interface firewall is no longer busy, namely busy signal 731 is not asserted, firewall status register 728 may be reset to an unblocked state. Along those lines, from a blocked-dormant state 753, interface firewall 700 may transition responsive to unblock requested transition 759 to normal operation state 751. In normal operation state 751, traffic may be allowed to again flow between trusted interface 701 and untrusted interface 702 through data 0 ports of output muxes 704 and 707.

If, however, an unblock request 725 is received from a host device to control interface 703 while interface firewall is busy, namely busy signal 731 is currently asserted, then interface firewall 700 may be still be in a blocked-busy state 752 when such unblock request 725 arrives. This condition may occur if the above-described procedure for recovery is not followed. In such an event, unblock request 725 remains "sticky" waiting for busy signal 731 to become de-asserted. For this situation, interface firewall performs an unblock requested transition 756 from blocked-busy state 752 to unblock pending state 754 during such time unblock request 725 is pending or sticky. When busy signal 731 is eventually de-asserted, firewall status register 728 is reset to an unblocked state, as previously described for de-assertion of queue empty signal 718/busy signal 731. Along those lines, interface firewall 700 performs a NOT busy transition 757 from unblock pending state 754 to normal operation state 751.

Accordingly, an interface firewall, such as may be implemented in an FPGA for example, may be configured to detect a fault associated with a primary interface side, secondary interface side, or both primary and secondary interface sides of such an interface firewall. Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 8:
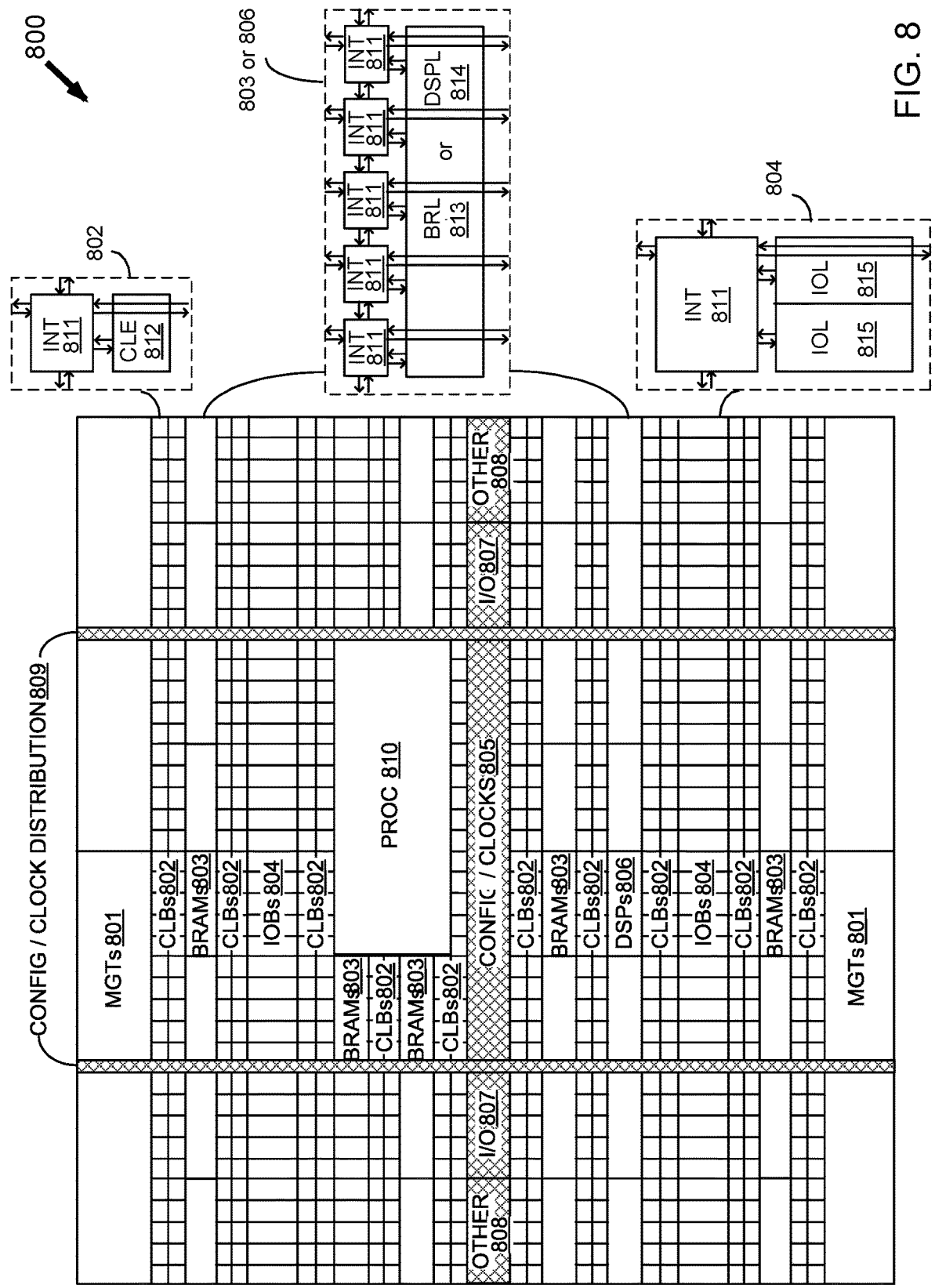
FIG. 8 is a simplified block diagram depicting an exemplary columnar Field Programmable Gate Array ("FPGA") architecture.

As noted above, advanced FPGAs can include several different types of programmable logic blocks in the array. For example, FIG. 8 illustrates an FPGA architecture 800 that includes a large number of different programmable tiles including multi-gigabit transceivers ("MGTs") 801, configurable logic blocks ("CLBs") 802, random access memory blocks ("BRAMs") 803, input/output blocks ("IOBs") 804, configuration and clocking logic ("CONFIG/CLOCKS") 805, digital signal processing blocks ("DSPs") 806, specialized input/output blocks ("I/O") 807 (e.g., configuration ports and clock ports), and other programmable logic 808 such as digital clock managers, analog-to-digital converters, system monitoring logic, and so forth. Some FPGAs also include dedicated processor blocks ("PROC") 810.

In some FPGAs, each programmable tile includes a programmable interconnect element ("INT") 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the top of FIG. 8.

For example, a CLB 802 can include a configurable logic element ("CLE") 812 that can be programmed to implement user logic plus a single programmable interconnect element ("INT") 811. A BRAM 803 can include a BRAM logic element ("BRL") 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element ("DSPL") 814 in addition to an appropriate number of programmable interconnect elements. An 10B 804 can include, for example, two instances of an input/output logic element ("IOL") 815 in addition to one instance of the programmable interconnect element 811. As will be clear to those of skill in the art, the actual I/O pads connected, for example, to the I/O logic element 815 typically are not confined to the area of the input/output logic element 815.

In the pictured embodiment, a horizontal area near the center of the die (shown in FIG. 8) is used for configuration, clock, and other control logic. Vertical columns 809 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 810 spans several columns of CLBs and BRAMs.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A system for protection of a bussed network, comprising:
   an access controller configured for bussed communication via a communication bus to obtain a current transaction;
   an interface firewall coupled for bussed communication with the access controller and configured to check for a fault associated with a transfer;
   a data processing device coupled for communication with the interface firewall and configured to execute the current transaction to provide the transfer for the interface firewall, wherein the access controller, the interface firewall, and the data processing device are part of a same expansion card; and
   the interface firewall configured to detect the fault associated with the transfer, to block access to the data processing device associated with the fault, and to communicate a blocked status for the data processing device.

2. The system according to claim 1, wherein:
   the fault is a bus protocol violation; and
   the interface firewall is configured to generate a protocol compliant response for the current transaction outstanding.

3. The system according to claim 1, wherein:
   the fault is a bus protocol violation; and
   the interface firewall is configured to generate a protocol compliant response for a subsequent unblocked transaction.

4. The system according to claim 1, wherein:
   the fault is a bus protocol violation; and
   the interface firewall is configured to provide either a read blocked status or a write blocked status for the blocked status respectively for a read transaction and a write transaction for the current transaction.

5. The system according to claim 1, wherein:
   the fault is a timed-out state; and
   the interface firewall is configured to detect the timed-out state for the current transaction and to communicate the blocked status for the data processing device having the timed-out state.

6. The system according to claim 1, further comprising:
   a plurality of data processing devices including the data processing device coupled for communication with the interface firewall and configured to execute current transactions to return corresponding transfers; and
   the interface firewall configured to block access to the data processing device and to allow a remainder of the plurality of data processing devices to continue to operate without blocked access.

7. The system according to claim 6, wherein the interface firewall comprises a control-register interface configured to:
   indicate the blocked status of the data processing device;
   store information regarding cause of the blocked status;
   provide access to the information stored; and
   initiate a reset of the data processing device for recovery thereof.

8. The system according to claim 7, wherein the control-register interface is configured to have timeout limits for a set of transactions, to control read and write unblock requests, and to control soft block requests.

9. The system according to claim 7, wherein:
   the access controller is a direct memory access controller;
   the control-register interface and a bus interface of the interface firewall are respectively coupled to the direct memory access controller by a first switch and a second switch, respectively; and
   the direct memory access controller, the first switch, the second switch, the interface firewall, and the plurality of data processing devices are all of the expansion card.

10. A method for protection of a bussed network, comprising:
    receiving, via a communication bus, a current transaction at an access controller;
    bussing the current transaction to an interface firewall coupled with the access controller;
    passing the current transaction to a data processing device coupled with the interface firewall;
    executing the current transaction by the data processing device to provide a transfer to the interface firewall, wherein the access controller, the interface firewall, and the data processing device are part of a same expansion card;
    checking by the interface firewall for a fault associated with the transfer;
    detecting the fault associated with the transfer by the interface firewall;
    blocking access by the interface firewall to the data processing device associated with the fault; and
    communicating by the interface firewall a blocked status for the data processing device.

11. The method according to claim 10, further comprising generating by the interface firewall a protocol compliant response for the current transaction outstanding.

12. The method according to claim 10, further comprising generating by the interface firewall a protocol compliant response for a subsequent unblocked transaction for the fault being a bus protocol violation.

13. The method according to claim 10, further comprising providing by the interface firewall either a read blocked status or a write blocked status for the blocked status respectively for a read transaction and a write transaction for the current transaction.

14. The method according to claim 10, wherein:
the detecting by the interface firewall is for a timed out state for the fault associated with the current transaction; and
the communicating by the interface firewall of the blocked status is for the data processing device having the timed out state.

15. The method according to claim 10, further comprising:
the communicating being between the interface firewall and a plurality of data processing devices including the data processing device;
the executing including current transactions to return corresponding transfers without faults other than for the current transaction; and
allowing a remainder of the plurality of data processing devices to continue to operate without blocking accesses while maintaining the blocking of access to the data processing device associated with the fault.

16. The method according to claim 10, wherein the interface firewall comprises a control-register interface, the method further comprising:
indicating the blocked status of the data processing device from the control-register interface;
storing information regarding cause of the blocked status in the control-register interface;
providing access via the control-register interface to the information stored; and
initiating a reset of the data processing device for recovery thereof.

17. The method according to claim 16, further comprising configuring the control-register interface to have timeout limits for a set of transactions, to control read and write unblock requests, and to control soft block requests.

18. The method according to claim 10, further comprising:
detecting a blocked access condition by a host device from the interface firewall communicated via the communication bus;
discontinuing by the host device any further issuing of both read and write transactions into a data interface of the interface firewall;
asserting by the host device a reset signal for the expansion card via the communication bus, the expansion card including the interface firewall, the access controller and the data processing device;
resetting at least the data processing device responsive to the reset signal; and
requesting by the host device unblocking of the blocked status by the interface firewall.

19. The method according to claim 18, wherein the resetting of the at least the data processing device includes a partial or complete dynamic reconfiguration thereof.

20. The method according to claim 18, further comprising interrogating a control-register interface of the interface firewall for diagnostic purposes regarding the fault.

* * * * *